(12) United States Patent
Liu

(10) Patent No.: US 7,639,123 B2
(45) Date of Patent: Dec. 29, 2009

(54) FASTEN DEVICE FOR TIRE PRESSURE ALARM TRANSMITTER

(75) Inventor: Xiangping Liu, Shenzhen (CN)

(73) Assignee: China Modern Associated & Industrial Development Co., Ltd., Shenzhen, Guangdong (CN)

( * ) Notice: Subject to any disclaimer, the term of this patent is extended or adjusted under 35 U.S.C. 154(b) by 192 days.

(21) Appl. No.: 11/929,973

(22) Filed: Oct. 30, 2007

(65) Prior Publication Data

US 2009/0015416 A1    Jan. 15, 2009

(30) Foreign Application Priority Data

Oct. 31, 2006    (CN) .................... 2006 2 0015537 U

(51) Int. Cl.
    *B60C 23/02* (2006.01)

(52) U.S. Cl. .................. 340/442; 340/444; 340/426.33; 340/626; 340/693.9; 73/146; 73/146.2; 73/146.8; 73/147

(58) Field of Classification Search ................. 340/442, 340/444, 426.33, 391.1, 396.1, 626, 693.9, 340/146, 146.2, 146.8, 147; 152/415, 416, 152/427

See application file for complete search history.

(56) References Cited

U.S. PATENT DOCUMENTS

| | | | |
|---|---|---|---|
| 6,722,409 B1 * | 4/2004 | Martin | 152/427 |
| 6,840,099 B2 * | 1/2005 | Luce | 73/146 |
| 7,059,178 B2 * | 6/2006 | Fischer et al. | 73/147 |

* cited by examiner

*Primary Examiner*—Hung T. Nguyen
(74) *Attorney, Agent, or Firm*—Global IP Services; Tianhua GU

(57) ABSTRACT

A fasten device for tire pressure alarm transmitter, which comprises a fasten base for fastening a valve core style transmitter, and a strip for binding the fasten base on wheel rim, wherein: the fasten base has a board shaped support portion, and a hole for accepting the strip to drill through is set on the support portion; a securing board is set on the middle portion of the support portion, and a position slot that matches with the valve core of the transmitter is excavated on the securing board; and a buckle that matches with the securing board is set on one end of the support portion to fasten the transmitter corporately. As the fasten base having a support portion, a buckle and a securing board with position slot are provided on the support portion.

16 Claims, 2 Drawing Sheets

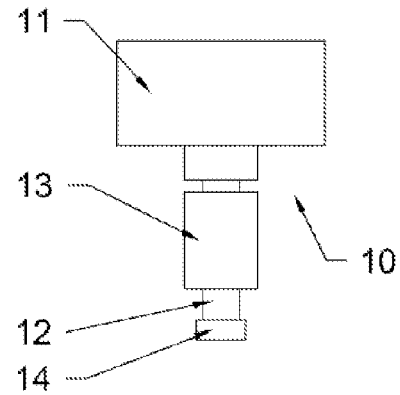
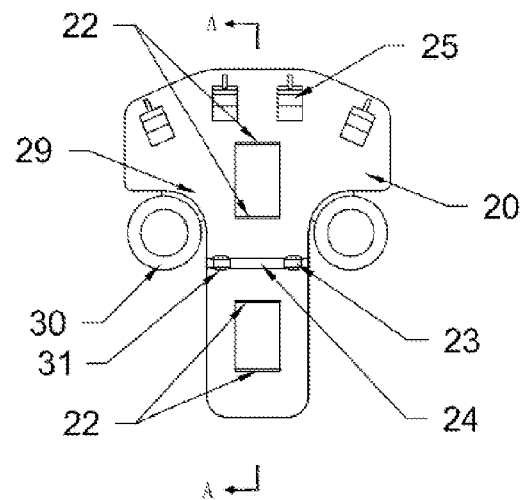
Fig 1 PRIOR ART
Fig 3
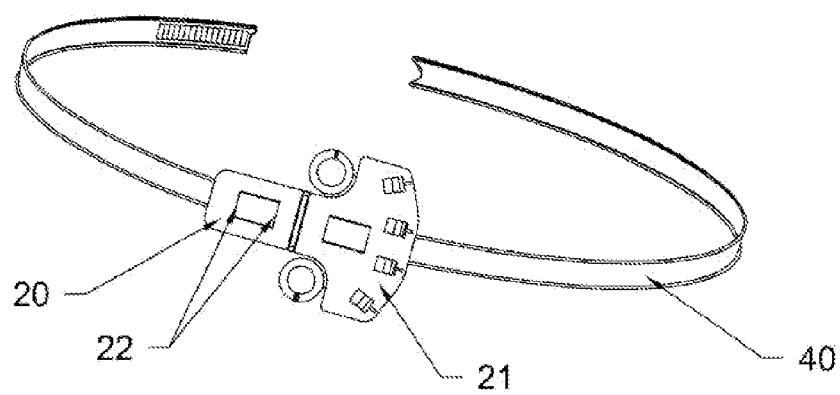
Fig 2

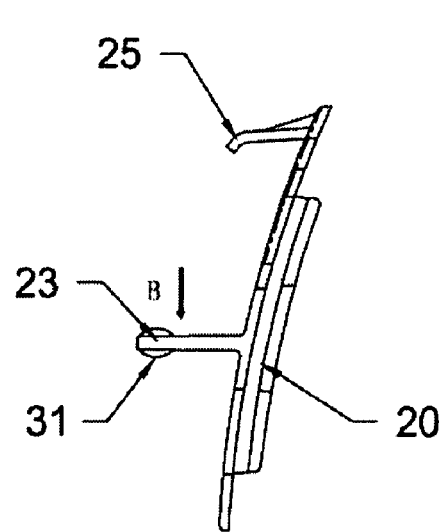
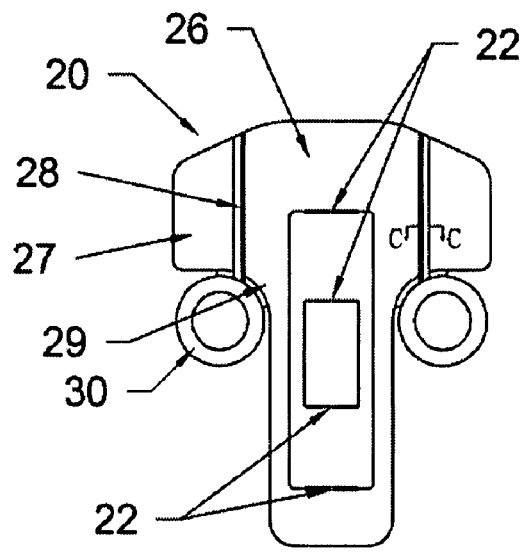
Fig 4           Fig 5
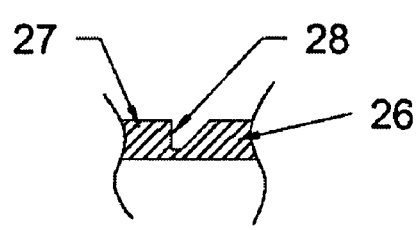
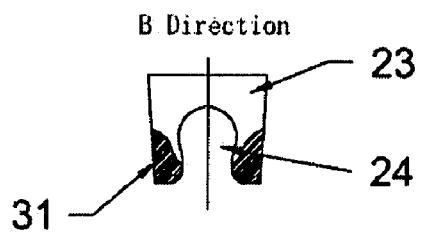
Fig 6           Fig 7 ions, Chinese patent application filed 2006-10-31.

FASTEN DEVICE FOR TIRE PRESSURE ALARM TRANSMITTER

CROSS REFERENCE TO THE RELATED PATENT APPLICATION

This application claims the priority of the Chinese patent application No. 200620015537.6 with a filing date of Oct. 31, 2006.

FIELD OF THE INVENTION

The present invention relates to automobile tire pressure alarm devices, and more particularly to a fasten device for automobile tire pressure alarm transmitter.

BACKGROUND OF THE INVENTION

When an automobile is running in high speed, its tire often blows out to cause traffic accidents. Tire blowout is the most worrying and unpreventable trouble for drivers in long period of time. As a result, TMPS (Tire Pressure Monitoring System) is developed to automatically monitor the tire pressure in real time when an automobile in is running. The main point of the system is that a sensitive sensor is provided on each tire, and the data of inner pressure and temperature of the tires are detected either the automobile is in running or at rest, then the data can be sent by a transmitter to the receptor in the driver's cab, and then the driver is reminded by voice or light, thus safe driving is ensured.

TPMS transmitter in the prior art usually has two kinds of installation configurations. One is tire valve core style, which is attaching transmitter on the wheel rim near the valve core. The defect of this configuration is obvious: when charging the tire, the tire valve need to be opened up. Thus the fastener for fixing the transmitter is easy to lose; and further more, when opening up the tire valve, it is un-avoidable to touch the transmitter directly. Thus the sensitivity of the sensor may be affected and an expensive sensor may be changed frequently. Another kind of installing configuration of TPMS transmitter is binding style, which is binding a holder that attached with a transmitter on the wheel rim. And the transmitter is hiding below the tire, this configuration does not has the problem of knock-down, and the sensor will keep its sensitivity and have long useful life.

But the transmitter for the two kinds of installation styles are different with each other in their structures, the transmitter using in tire valve core style configuration has a valve core integrate with a transmitter, and a fasten nut for fixing the valve core on the wheel rim near the valve core, as shown in FIG. 1; and the transmitter used in binding style configuration usually be designed as a cuboids that can be locked on a fasten base. Due to the different structures, the transmitter used in tire valve core style is unable to be locked on the fasten base of the binding style, if a consumer wants to change the installation style of the transmitter from valve core style to binding style, he must buy a new transmitter to match with the fasten base, as the transmitter is always expensive and the old one is useless anymore. Thus cost will be increased.

SUMMARY OF THE INVENTION

It is an object of the present invention to provide a new fasten device for tire pressure alarm transmitter, which can solve the problem that the transmitter in tire valve core style can not be applied in biding style in the prior art and a consumer need to buy a new transmitter for biding style.

The technical problem solved by the present invention is, providing a fasten device for tire pressure alarm transmitter, which comprises a fasten base for fixing a transmitter used for valve core style, and a strip for binding the fasten base on wheel rim, wherein: the fasten base has a board shaped support portion, and a hole for accepting the strip to drill through is set on the support portion; a securing board is set on the middle portion of the support portion, and a position slot that matching with the valve core of the transmitter is excavated on the securing board; and a buckle that matches with the securing board is set on one end of the support portion to fasten the transmitter corporately.

Preferably, the support portion of the fasten base is in "T" shape to match with the shape of the valve core style transmitter.

Preferably, two creases for breaking off the side wings of "T" shaped support portion are provided on the top portion of "T" shaped support portion.

Preferably, a gasket is set on the side face of the securing board and closed to the position slot. Preferably, the gasket is breakable and it is set on the waist portion of "T" shaped support portion.

Preferably, a bulge for restricting the fasten nut of the valve core style transmitter on the side of the position slot is provided on the porthole of the position slot.

Preferably, two or four or a plurality of buckles are set on one end of the support portion. Preferably, the porthole of the position slot shrinks centripetally to form a "Ω" shape.

The advantageous technical effects produced by the invention are: as the fasten base having a support portion, a buckle and a securing board with position slot are provided on the support portion, the valve core of the transmitter can be fixed inside the position slot. And the transmitter is fastened on the fasten base by the buckle together with the securing board. Then it is installed on the wheel rim by the strip. By the fasten device for tire pressure alarm transmitter of the present invention, the valve core style transmitter then can be bound on the tire through the special fasten base, it provides more choice for consumers, and consumers need not buy an expensive transmitter when they want change their TPMS from valve core style to binding style. Thus cost is saved.

BRIEF DESCRIPTION OF THE DRAWINGS

The invention will now be described by way of examples with reference to the drawings, in which:

FIG. 1 is a structure view of the valve core style transmitter in the prior art;

FIG. 2 is a structure view of the clamp device for tire pressure warning transmitter, in accordance with the preferred embodiment of the present invention;

FIG. 3 is a structure view of the fasten base of the fasten device, in accordance with the preferred embodiment of the present invention;

FIG. 4 is a sectional view along A-A line of FIG. 3;

FIG. 5 is a back view of FIG. 3;

FIG. 6 is a partial sectional view along C-C line of FIG. 5;

FIG. 7 is a partial directional view along B direction of FIG. 4.

DETAILED DESCRIPTION OF THE INVENTION

The valve core style transmitter 10 in the prior art usually includes a shell 11 and a valve core 12 incorporated with the shell 11, a fasten nut 13 for fastening the transmitter 10 on the wheel rim is set on the valve core 12, and a protective cap 14 is set on the end of the valve core 12, as shown in FIG. 1, this kind of transmitter is usually "T" in shape.

As shown in FIG. 2, in one preferred embodiment of the fasten device for tire pressure alarm transmitter of the present invention, the device includes a fasten base 20 for fixing the valve core style transmitter 10, and a strip 40 for binding the fasten base 20 on wheel rim, wherein: the fasten base 20 further includes a board shaped support portion 21, preferably, the support portion 21 is set as "T" which matches with the shape of the transmitter 10, so that the whole transmitter 10 can be held up by the fasten base 20. A hole 22 is set on the bottom of the fasten base 20, and the strip 40 drills through the hole to bind the fasten base on the wheel rim. As shown in FIGS. 3 and 5, in the preferred embodiment, four holes 22 are provided on the bottom of the fasten base 20, the strip 40 drills through the four holes 22 orderly.

As shown in FIGS. 3, 4 and 7, a securing board 23 is set on the middle of the support portion 21, a position slot 24 that matches with the valve core of the transmitter is excavated on the top of the securing board 23. On one end of the support portion 21, two buckles 25 that matches with the securing board 23 for jointly fastening the transmitter 10 are set thereon, that is, the distance between the buckles 25 and the securing board 23 matches with the size of shell 11 of the transmitter, the shell 11 can be locked between the buckles 25 and the securing board 23 fitly, thus the shell 11 of the transmitter 10 can be installed on the support portion 21. As shown in FIG. 7, the porthole of the position slot 24 shrinks centripetally to form a "Ω" shape, that is, the width of the porthole is a little smaller than the width of the slot on bottom, while the diameter of the valve core 12 of the transmitter 10 is a little larger than the width of the porthole but a little smaller than the width of the slot on bottom, thus the valve core 12 of the transmitter 10 can be locked in the position slot 24 fitly.

While installing, the valve core 12 of the valve core style transmitter 10 is locked in the position slot 24 of the securing board 23. And then the fasten nut 13 is fastened in the valve core 12. Thus the valve core 12 is fixed on the securing board 23. And the shell 11 of the transmitter is fixed between the buckle 25 and securing board 23, so that the whole transmitter 10 is fixed on the fasten base 20. Then the fasten base 20 is bound on the wheel rim by the strip 40, thus the valve core style transmitter 10 can be fixed on the wheel rim in binding style. So the consumer need not buy a special transmitter for binding style, and they can use the valve core style transmitter directly to reduce cost.

As shown in FIGS. 3, 4 and 7, a bulge 31 is provided on the side of the securing board 23 at the end of the porthole of the position slot 24, the bulge 31 together with the securing board 23 forms a concavity, so that the fasten nut 13 of the transmitter 10 can be set in the concavity and it can be restricted on the side of the securing board 23. While installing, the position of the fasten nut 13 on the valve core 12 should be adjusted, and when locking the valve core 12 into the position slot 24, the fasten nut 13 should be fastened into the concavity between the bulge 31 and the securing board 23 directly, while the fasten nut 13 need not be adjusted any more. Thus the whole transmitter 10 can be installed on the fasten base easily and rapidly.

In the above embodiment, two creases 28 for breaking off the side wings 27 of the support portion are provided on the top portion 26 of the "T" shaped support portion, as shown in FIGS. 5 and 6. The creases 28 are grooves on the side wings 27, when the size of the shell 11 of the valve core style transmitter 10 is a little smaller, the side wings 27 can be broken off along the creases 28. Thus the mounting space of the fasten base 20 can be decreased, and installation can be easier.

In the above embodiment, a gasket 30 is provided on the side of the securing board 23 which is closed to the position slot 24, the gasket 30 is used for sleeving on the transmitter's valve core 12 to adjust the interstice between the shell 11 of the transmitter and the securing board 23, so that different sizes of transmitters can be fixed on the fasten base 20 when adjusting the clamp nut 13. As shown in FIG. 3, the gasket 30 is breakable and it is set on the waist portion 29 of "T" shaped support portion 21. The gasket is partially connected with the "T" shaped waist portion 29 by integral injection molding. Thus the gasket 30 can be easily broken off along the outline of "T" shaped waist portion 29. When the transmitter's shell 11 is smaller, the gasket 30 can be broken off on "T" shaped waist portion 29 position of the support portion 21, and sleeved on the valve core 12 between the shell 11 and the securing board 23. As a result, the gasket can be used to offset the interstice between shell 11 and the securing board 23 when adjusting the fasten nut 13. Thus the transmitter 10 can be fixed on the fasten base 20 more firmly and more reliably.

And in the above embodiment, the number of the buckles 25 can further be set as four or more to fit for different size of transmitters. Something is available, while something is already invalidated.

What is claimed is:

1. A fasten device for tire pressure alarm transmitter comprising: a fasten base for fastening a valve core style transmitter, and a strip for binding the fasten base on wheel rim; the fasten base having a board shaped support portion, holes for accepting the strip to pass through being set on the support portion; a securing board being set on a middle portion of the support portion, a position slot that matches with a valve core of the transmitter being excavated on the securing board; and a buckle being set on one end of the support portion for cooperating with the securing board to fasten the transmitter.

2. The fasten device for tire pressure alarm transmitter according to claim 1, wherein the support portion of the fasten base is in "T" shape to match with the shape of the valve core style transmitter.

3. The fasten device for tire pressure alarm transmitter according to claim 2, wherein two creases for breaking off the side wings of "T" shaped support portion are provided on the top portion of "T" shaped support portion.

4. The fasten device for tire pressure alarm transmitter according to claim 2, wherein a gasket is set on the side face of the securing board for different sizes of the transmitters can be fixed on the fasten base.

5. The fasten device for tire pressure alarm transmitter according to claim 3, wherein a gasket is set on the side face of the securing board which is closed to the position slot for getting it easily.

6. The fasten device for tire pressure alarm transmitter according to claim 4, wherein the gasket is on the side face of the securing board which is closed to the position slot for getting it easily.

7. The fasten device for tire pressure alarm transmitter according to claim 5, wherein the gasket is set on and separate-able from the waist portion of "T" shaped support portion.

8. The fasten device for tire pressure alarm transmitter according to claim 1, wherein a bulge for restricting the fasten nut of the valve core style transmitter on the side of the position slot is provided on the porthole of the position slot.

9. The fasten device for tire pressure alarm transmitter according to claim 2, wherein a bulge for restricting the fasten nut of the valve core style transmitter on the side of the position slot is provided on the porthole of the position slot.

10. The fasten device for tire pressure alarm transmitter according to claim 3, wherein a bulge for restricting the fasten nut of the valve core style transmitter on the side of the position slot is provided on the porthole of the position slot.

11. The fasten device for tire pressure alarm transmitter according to claim 1, wherein two or four or a plurality of buckles are set on one end of the support portion.

12. The fasten device for tire pressure alarm transmitter according to claim 2, wherein two or four or a plurality of buckles are set on one end of the support portion.

13. The fasten device for tire pressure alarm transmitter according to claim 3, wherein two or four or a plurality of buckles are set on one end of the support portion.

14. The fasten device for tire pressure alarm transmitter according to claim 1, wherein the porthole of the position slot shrinks centripetally to form a "Ω" shape.

15. The fasten device for tire pressure alarm transmitter according to claim 2, wherein the porthole of the position slot shrinks centripetally to form a "Ω" shape.

16. The fasten device for tire pressure alarm transmitter according to claim 3, wherein the porthole of the position slot shrinks centripetally to form a "Ω" shape.

* * * * *